Inventor
Willis A. Boothe
by Paul A. Frank
His Attorney

United States Patent Office 3,273,558
Patented Sept. 20, 1966

3,273,558
SELF-CONTROLLING GAS GENERATOR
Willis A. Boothe, Scotia, N.Y., assignor to General Electric Company, a corporation of New York
Filed July 28, 1964, Ser. No. 385,608
5 Claims. (Cl. 126—271)

The present invention relates to gas generators and, more particularly, to a self-controlling gas generator.

With the rapid advances in technology, the need arises for containers capable of storing liquid and supplying gas generated therefrom at a constant delivery pressure without resorting to burdensome equipment exterior to the system itself.

This is especially true in spacecraft where weight limitations require apparatus that operates efficiently on solar power alone, without the need of extra power equipment. Apparatus is needed that will operate from the solar energy present in space without consuming the precious fuel aboard the spacecraft. In nonspace applications, there exists a need for apparatus that operates by available solar energy without fuel or electrical power added thereto.

Presently, in both space and nonspace applications, apparatus for storing a liquid and supplying gas generated therefrom, entails employing a multiplicity of equipment including separate containers, for the liquid and gas with separate power equipment for producing the desired results. The need then arises for a self-contained unit that operates by available solar energy alone to supply gas at a constant pressure from a liquid stored within the same unit, thus obviating the necessity of equipment exterior to the system itself.

One important use of such a system is in the field of gas operated control devices, i.e., fluid amplifiers. Devices such as these operate effectively without outside power, only requiring a constant supply of gas at a predetermined pressure.

The present invention envisions a combination gas storage and supply unit having means for self regulation of its internal pressure.

The chief object of my invention is a provision of a gas generator which supplies gas at a constant exit pressure from a liquid supply source within the generator and maintains this exit pressure constant at all times.

Another object of my invention is a provision of a gas generator whereby the gas pressure within the generator regulates the heat being transmitted into the generator.

Another object of my invention is a provision of a gas generator which employs solar energy as its only power means.

A further object of my invention is the provision of a gas generator that is self regulating in that it controls and limits its own internal pressure.

These and other objects of my invention will be more readily perceived from the description which follows.

One of the features of my invention is a highly efficient gas generator which operates only by solar energy and is capable of regulating its internal pressure in order to supply gas at a constant exit pressure.

The attached drawings illustrate preferred embodiments of my invention in which.

Figure 1:
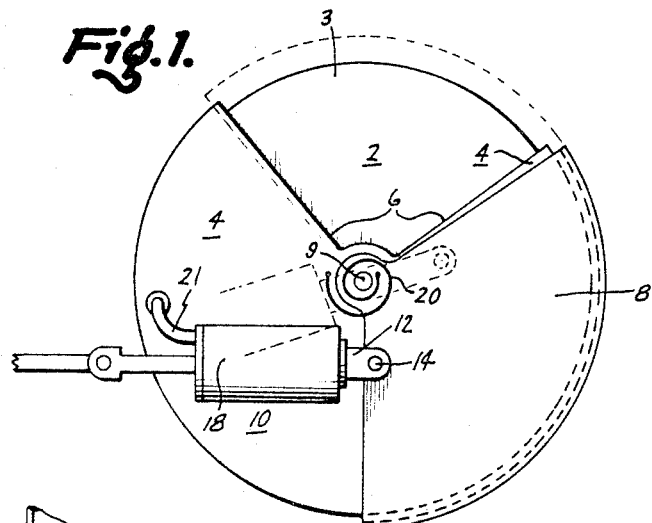
FIGURE 1 is a view of the apparatus of my invention with the reflecting shield in both an open and closed position.
Figures 2, 5:
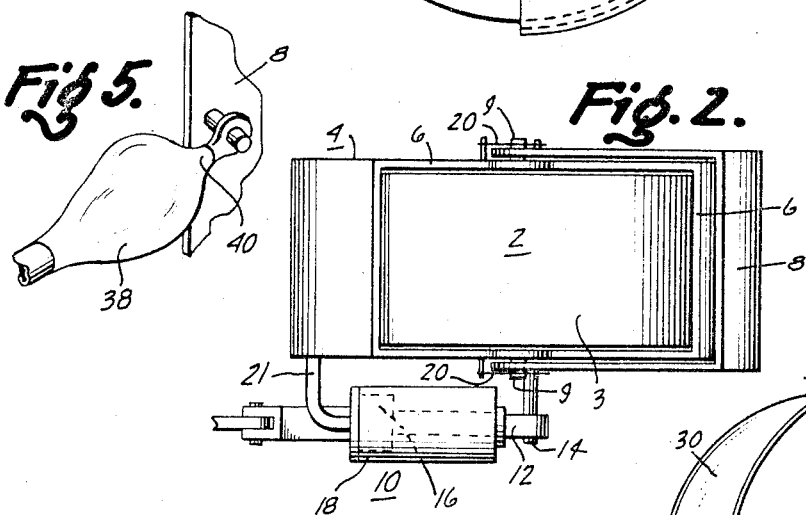
FIGURE 2 is a plan view of the apparatus of FIGURE 1.
FIGURE 5 is a view of a modification of the self-regulating means of FIGURE 1.

In FIGURE 1 there is a shown a view of the gas generator embodying my invention. The construction includes cylindrical enclosed tank 2 for storing both the liquified gas, i.e., butane, propane, etc., and the evaporate generated therefrom. Tank 2 has a black exterior to make full use of the black body principle and provide maximum heat absorption into tank 2. According to this principle a black surface is the best absorber of thermal energy; thus providing the maximum heat possible through tank 2 to the contents thereof. Surrounding tank 2 and coaxially located is a cylindrical tank 4 having a shiny exterior reflecting surface for the least absorption of heat into cylinder 4. A shiny surface, i.e., silver, is an excellent reflector and thus a poor absorber of heat. Cylinder 4 completely surrounds tank 2 except for a pie shaped wedge or sector 6 cut out of cylinder 4 to expose corresponding part 3 of tank 2. Coaxially positioned, with respect to the axis of tank 2 and cylinder 4, is movable eyelid type reflecting heat shield 8, positioned exterior to both cylinder 4 and tank 2 as shown in FIGURE 2. Shield 8 is movable between an open position, as shown by the solid lines in FIGURE 1, that completely exposes sector 3 of tank 2, and a closed position as shown by the dotted lines in FIGURE 1. In the closed position shield 8 completely covers part 3 of tank 2, thereby completely surrounding tank 2 with shiny reflecting heat surfaces, and thereby preventing heat absorption into tank 2. Shield 8 rotates between its open and closed positions about pivot pin 9.

The automatic pressure operated closure for the eyelid shield 8 is a piston and cylinder arrangement 10, consisting of pushrod 12 which is secured by means of pivot 14 to reflecting shield 8. Pushrod 12, shown in FIGURE 1 in both its extended and contracted positions, connects with piston 16 which travels in cylinder 18, in response to pressure variations within tank 2.

Spring 20 located around pivot pin 9 is adjusted to keep eyelid shield 8 in the open position or return it thereto from the closed position, as indicated by the dotted lines in FIGURE 1, after pushrod 12 has placed it in that position.

In operation, the sun or other source of energy transmits its heat to tank 2 which has a black surface, to absorb and supply to its contents the maximum heat possible. In this open position, as shown by the solid lines in FIGURE 1, where shield 8 does not cover tank 2, this absorption process of the solar rays continues at a maximum rate. Heat transmitted through tank 2 causes the liquified gas within tank 2 to quickly elevate in temperature and pressure and begin to evaporate to its gaseous state within tank 2. As this pressure builds up, it is transmitted through tube 21 into cylinder 18 and against piston 16. When the pressure becomes sufficient to move cylinder 16 and pushrod 12 against the resisting force of spring 20, it begins to close reflecting shield 8 over tank 2. As pressure within tank 4 becomes greater, it overcomes the resistance of spring 20 and closes shield 8 over the exposed sector 3 of tank 2. As shield 8 begins to cover tank 2 less heat is absorbed by tank 2 since less of its black surface area is exposed to the solar rays. As the heat decreases, the pressure within tank 2 also begins to lessen due to the decrease in the evaporation rate within the tank. Thus, it is seen that the pressure in tank 2 is kept at a desired level by regulation of spring 20. Reflecting shield 8 moves to the closed position only when the pressure in tank 2 reaches a level to overcome the resistance of spring 20 and thereby move this shield. The aforementioned system provides a quick and easy method of having a gas generator control its own internal pressure and have this pressure maintained at a desired level.

Figure 3:
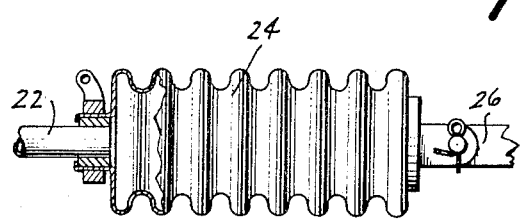
FIGURE 3 is a view of a modification of the self-regulating means of FIGURE 1.

FIGURE 3 illustrates a modification of the control cylinder of FIGURE 1. Instead of a cylinder, a bellows is provided, which expands and contracts in response to increased pressure within tank 2. Inlet line 22 permits the pressure to enter bellows 24 and expand it against pushrod 26 until the pressure is sufficient to overcome the force of spring 20 and close eyelid shield 8, in the same way as aforementioned.

Figure 4:
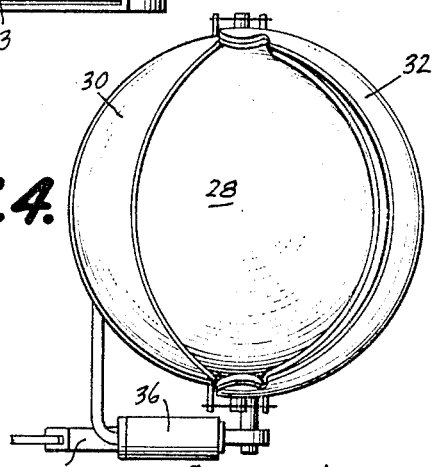
FIGURE 4 is a view of a modification of my invention.

FIGURE 4 illustrates a modification of the device of my invention in which tank 28 is spherical instead of cylindrical as before. Outer surrounding casing 30 and movable eyelid shield 32 are correspondingly spherical. The operation of this mode of my invention is the same as the aforementioned one. It is noted that bar 34 is employed to support end 36 of piston and cylinder closure means.

In FIGURE 5 is shown an alternate form of closure, in which an inflatable bag is employed. Bag 38 is secured between movable shield 8 and surrounding casing 4 in the same manner as the priorly mentioned forms of closures, with the exception that no pushrod is required, since end 40 of bag 38 is secured directly to shield 8. Therefore, as with the previously described closures, bag 38 will respond to an increase in pressure inside tank 4 and close shield 8 accordingly.

In employing my invention in outer space where there is an absence of gravity, an artificial gravitational field is set up by spinning the entire device, this drives the denser liquid to the outer periphery of the tank and the less dense gas towards the center of the tank where it is withdrawn.

It will be appreciated that the gas generator as described in my invention may be also employed as an evaporator in a refrigeration or air conditioning system or wherever gas evaporators can be successfully employed.

It is apparent that the invention obtains the objectives set forth. Apparatus embodying this invention is sturdy in construction and well adapted for use in atmospheric as well as outer space environments. Pressure regulation is accomplished in a highly efficient manner with full control over the maximum pressure within the gas generation tank.

While specific embodiments of my invention have been illustrated, my invention is not limited thereto since many modifications may be made by one skilled in the art, and the appended claims are intended to cover all such modifications as fall within the true spirit and scope of my invention.

What I claim as new and desire to secure by Letters Patent of the United States is:

1. A gas generator comprising
   a cylindrical storage tank having a black absorption surface for transmitting heat at a high rate to a liquid within said tank to evaporate the liquid,
   reflective means surrounding said tank, having a sector shaped opening to expose part of said surface of said storage tank,
   a reflecting shield movable between an open and closed position whereby in the closed position said shield completely covers the opening and thereby covers said exposed surface of said storage tank and in the open position completely exposes the opening and thereby exposes said surface of said storage tank,
   a cylinder connected to said storage tank, and
   a piston travelling in said cylinder connected to said shield and responsive to the pressure in said storage tank to cause said shield to cover said exposed portion of said storage tank when the pressure exceeds certain values.

2. A gas generator comprising
   a cylindrical storage tank having a black absorption surface for transmitting heat at a high rate to a liquid within said tank to evaporate the liquid,
   reflective means surrounding said tank, having a sector shaped opening to expose part of said surface of said storage tank,
   a reflecting shield movable between an open and closed position whereby in the closed position said shield completely covers the opening and thereby covers said exposed surface of said storage tank and in the open position completely exposes the opening and thereby exposes said surface of said storage tank,
   a cylinder connected to said storage tank,
   a piston travelling in said cylinder connected to said shield and responsive to the pressure in said storage tank to cause said shield to cover said exposed portion of said storage tank when the pressure exceeds certain values, and
   a spring for maintaining said reflecting shield in an open position and for returning said reflecting shield to this position from the closed position.

3. A gas generator comprising
   a cylindrical storage tank having a black absorption surface for transmitting heat at a high rate to a liquid within said tank to evaporate the liquid,
   reflective means surrounding said tank, having a sector shaped opening to expose part of said surface of said storage tank,
   a reflecting shield movable between an open and closed position whereby in the closed position said shield completely covers the opening and thereby covers said exposed surface of said storage tank and in the open position completely exposes the opening and thereby exposes said surface of said storage tank,
   a bellows connected to said storage tank,
   a pushrod connected between said bellows and said reflective shield and responsive to the pressure in said storage tank to cause said shield to cover said exposed portion of said storage tank when the pressure exceeds certain values, and
   a spring for maintaining said reflecting shield in an open position and for returning said reflecting shield to this position from the closed position.

4. A gas generator comprising
   a spherical storage tank having a black absorption surface for transmitting heat at a high rate to a liquid within said tank to evaporate the liquid,
   reflective means surrounding said tank, having a sector shaped opening to expose part of said surface of said storage tank,
   a reflecting shield movable between an open and closed position whereby in the closed position said shield completely covers the opening and thereby covers said exposed surface of said storage tank and in the open position completely exposes the opening and thereby exposes said surface of said storage tank,
   closure means connected between said reflective means and said movable shield responsive to the pressure in said storage tank to cause said shield to cover said exposed portion of said storage tank when the pressure exceeds certain values, and
   a spring for maintaining said reflecting shield in an open position and for returning said reflecting shield to this position from the closed position.

5. A gas generator comprising
   a storage tank having a black absorption surface for transmitting heat at a high rate to a liquid within said tank to evaporate the liquid,
   reflective means surrounding said tank, having an opening to expose part of said surface of the storage tank, a reflecting shield movable between open and closed positions, whereby in the closed position, the shield completely covers the opening and thereby covers the exposed surface of said tank and in the open position completely exposes the opening and thereby exposes the surface of said tank, and biasing means connecting the shield to the tank and responsive to pressure within the tank to cause the shield to cover the exposed portion of the tank when pressure therein exceeds certain values.

References Cited by the Examiner

UNITED STATES PATENTS

| | | | |
|---|---|---|---|
| 1,696,003 | 12/1928 | Harvey | 126—271 |
| 2,030,350 | 2/1936 | Bremser. | |
| 2,256,991 | 9/1941 | Sabins | 126—271 X |
| 2,259,902 | 10/1941 | McCain | 126—271 |
| 2,789,521 | 4/1957 | Wasp | 110—98 |
| 3,162,189 | 12/1964 | Small et al. | 126—270 |

CHARLES J. MYHRE, *Primary Examiner.*